(12) United States Patent
Shinohara et al.

(10) Patent No.: US 11,747,542 B2
(45) Date of Patent: Sep. 5, 2023

(54) DISPLAY METHOD

(71) Applicant: Omron Corporation, Kyoto (JP)

(72) Inventors: Masayuki Shinohara, Kyoto (JP);
Yasuhiro Tanoue, Kyoto (JP);
Norikazu Kitamura, Kyoto (JP);
Mitsuru Okuda, Kyoto (JP)

(73) Assignee: Omron Corporation, Kyoto (JP)

( * ) Notice: Subject to any disclaimer, the term of this patent is extended or adjusted under 35 U.S.C. 154(b) by 138 days.

(21) Appl. No.: 17/184,266

(22) Filed: Feb. 24, 2021

(65) Prior Publication Data

US 2021/0215949 A1 Jul. 15, 2021

Related U.S. Application Data

(63) Continuation of application No. 16/341,589, filed as application No. PCT/JP2017/041879 on Nov. 21, 2017, now abandoned.

(30) Foreign Application Priority Data

Mar. 14, 2017 (JP) ................................ 2017-048642

(51) Int. Cl.
*G02B 30/27* (2020.01)
*F21V 8/00* (2006.01)
(Continued)

(52) U.S. Cl.
CPC ........... *G02B 6/0036* (2013.01); *G02B 30/27* (2020.01); *G02B 30/33* (2020.01); *G02B 30/35* (2020.01)

(58) Field of Classification Search
CPC ........ G02B 30/27; G02B 30/33; G02B 30/35; G02B 6/0048; H04N 13/139
(Continued)

(56) References Cited

U.S. PATENT DOCUMENTS

| 3,583,809 A | 6/1971 | Dubuisson |
| 6,847,488 B2 | 1/2005 | Travis |

(Continued)

FOREIGN PATENT DOCUMENTS

| CN | 101680976 A | 3/2010 |
| CN | 101868751 A | 10/2010 |

(Continued)

OTHER PUBLICATIONS

International Search Report issued in Application No. PCT/JP2017/041879, dated Feb. 13, 2018 (2 pages).
(Continued)

*Primary Examiner* — Audrey Y Chang
(74) *Attorney, Agent, or Firm* — Osha Bergman Watanabe & Burton LLP (57) ABSTRACT

When an optical element is transparent, an observer is enabled to visually recognize a stereoscopic image having a stereoscopic effect. A display method for a stereoscopic image, using a display device provided with a transparent light guide plate, includes: emitting light to be recognized by the observer as a stereoscopic image (I1) from an optical element; and displaying the stereoscopic image (I1) on a stereoscopic image forming plane (P1) not parallel to an outgoing surface (21) of the optical element. In the display method, the observer is able to visually recognize a rear surface side of the display device through the optical element.

4 Claims, 9 Drawing Sheets

(51) Int. Cl.
*G02B 30/35* (2020.01)
*G02B 30/33* (2020.01)

(58) Field of Classification Search
USPC .................. 359/462, 464, 466; 348/47, 51
See application file for complete search history.

(56) References Cited

U.S. PATENT DOCUMENTS

| | | | |
|---|---|---|---|
| 9,235,057 | B2 | 1/2016 | Robinson et al. |
| 2004/0202364 | A1 | 10/2004 | Otani et al. |
| 2006/0056791 | A1 | 3/2006 | Tzschoppe |
| 2007/0109505 | A1 | 5/2007 | Kubara et al. |
| 2010/0073463 | A1* | 3/2010 | Momonoi ............ H04N 13/139 348/47 |
| 2010/0177402 | A1 | 7/2010 | Maekawa |
| 2010/0214394 | A1* | 8/2010 | Maekawa ............ G02B 30/56 348/51 |
| 2012/0050487 | A1 | 3/2012 | Masumura et al. |
| 2012/0076261 | A1 | 3/2012 | Tajima |
| 2014/0268327 | A1* | 9/2014 | Dunn ............ G02B 30/56 359/466 |
| 2015/0160404 | A1* | 6/2015 | Robinson ............ G02B 6/0048 359/464 |
| 2015/0234477 | A1 | 8/2015 | Abovitz et al. |
| 2016/0057411 | A1 | 2/2016 | Shinohara |
| 2017/0013256 | A1 | 1/2017 | Juni |
| 2017/0192244 | A1 | 7/2017 | Shinohara et al. |
| 2018/0129061 | A1 | 5/2018 | Shinohara et al. |

FOREIGN PATENT DOCUMENTS

| | | | |
|---|---|---|---|
| CN | 102429729 | A | 5/2012 |
| CN | 105388650 | A | 3/2016 |
| CN | 106030379 | A | 10/2016 |
| JP | H10-26740 | A | 1/1998 |
| JP | 2004-101589 | A | 4/2004 |
| JP | 2011-175297 | A | 9/2011 |
| JP | 2012-118378 | A | 6/2012 |
| JP | 2016-18194 | A | 2/2016 |
| JP | 5861797 | B1 | 2/2016 |
| JP | 2016-45424 | A | 4/2016 |
| JP | 2016-114929 | A | 6/2016 |
| WO | 2016/056345 | A1 | 4/2016 |
| WO | 2017/017981 | A1 | 2/2017 |

OTHER PUBLICATIONS

Written Opinion issued in International Application No. PCT/JP2017/041879, dated Feb. 13, 2019 (8 pages).
Office Action in counterpart Chinese Patent Application No. 2017800621329 dated Sep. 15, 2020 (18 pages).
Final Office Action issued in U.S. Appl. No. 16/341,589; dated Jan. 6, 2022 (20 pages).
Non-Final Office Action issued in related U.S. Appl. No. 16/341,589; dated Aug. 17, 2021 (21 pages).
Office Action in counterpart German Patent Application No. 112017007263.8 dated May 11, 2022 (10 pages).
Office Action issued in the counterpart U.S. Appl. No. 16/341,589, dated Mar. 8, 2021 (9 pages).
Advisory Action issued in the counterpart U.S. Appl. No. 16/341,589, dated May 7, 2021 (3 pages).
Office Action in counterpart Chinese Patent Application No. 202011497466.9 dated Aug. 17, 2022 (19 pages).

* cited by examiner

DISPLAY METHOD

TECHNICAL FIELD

The present invention relates to a display method and a display device for causing an observer to recognize a stereoscopic image.

BACKGROUND ART

Conventionally, as a display device for displaying a stereoscopic image, for example, an image display device disclosed in Patent Document 1 has been known.

The image display device disclosed in Patent Document 1 includes: a light guide plate; a light source provided at the end of the light guide plate; a first display pattern having a plurality of first prisms formed on the rear surface of the light guide plate; and a second display pattern having a plurality of second prisms formed on the rear surface of the light guide plate. The first display pattern forms a first image on the front surface side of the light guide plate with the plurality of first prisms and the second display pattern forms a second image on the front surface side of the light guide plate with the plurality of second prisms.

With this configuration, by appropriately setting the shapes (mainly the reflective surfaces) of the first prisms and the second prisms of the respective display patterns, for example, it is possible to generate a first image to be visually recognized with the observer's right eye and a second image to be visually recognized with the observer's left eye. It is thereby possible to cause the observer to recognize a stereoscopic image in a natural state without forcing the observer to perform an unnatural movement for fusion.

PRIOR ART DOCUMENT

Patent Document

Patent Document 1: Japanese Unexamined Patent Publication No. 2012-118378
Patent Document 2: Japanese Unexamined Patent Publication No. 2011-175297

SUMMARY OF THE INVENTION

Problems to be Solved by the Invention

However, in the image display device described in Patent Document 1, the light guide plate as an optical element is transparent, and a stereoscopic image is displayed on a plane parallel to the outgoing surface of the light guide plate. Therefore, the observer feels that the light emitting surface of the light guide plate is shining. As a result, there is a problem in which the observer hardly feels the stereoscopic effect of the stereoscopic image.

An object of one aspect of the present invention is to realize a display method for a stereoscopic image which enables an observer to visually recognize a stereoscopic image having a stereoscopic effect when the optical element is transparent.

Means for Solving the Problem

In order to solve the above problem, a display method according to one aspect of the present invention is a display method for a stereoscopic image, using a display device provided with a transparent optical element, the display method including: emitting light to be recognized by an observer as a stereoscopic image from the optical element; and displaying at least a part of the stereoscopic image on a plane not parallel to an outgoing surface of the optical element. In the display method, the observer is able to visually recognize a rear surface side of the display device through the optical element.

In order to solve the above problem, a display method according to one aspect of the present invention is a display method for a stereoscopic image, using a display device provided with a transparent optical element, the display method including emitting light to be recognized by an observer as a stereoscopic image from the optical element. In the display method, the observer is able to visually recognize a rear surface side of the display device through the optical element, and the stereoscopic image has two planes positioned on mutually different planes.

In order to solve the above problem, a display method according to one aspect of the present invention is a display method for a stereoscopic image, using a display device provided with a transparent optical element, the display method including emitting light to be recognized by an observer as a stereoscopic image from the optical element. In the display method, the observer is able to visually recognize a rear surface side of the display device through the optical element, and the stereoscopic image includes two line segments that are parallel to one plane and are not parallel to each other and one line segment that is not parallel to the plane.

Effect of the Invention

According to one aspect of the present invention, when the optical element is transparent, an effect is exerted to enable an observer to visually recognize a stereoscopic image having a stereoscopic effect.

MODE FOR CARRYING OUT THE INVENTION

First Embodiment

A display device 1A and a display method for the display device 1A according to the first embodiment of the present invention will be described in detail with reference to FIGS. 1 to 8.

(Configuration of Display Device 1A)

The configuration of the display device 1A will be described with reference to FIGS. 1 to 5.

Figure 1:
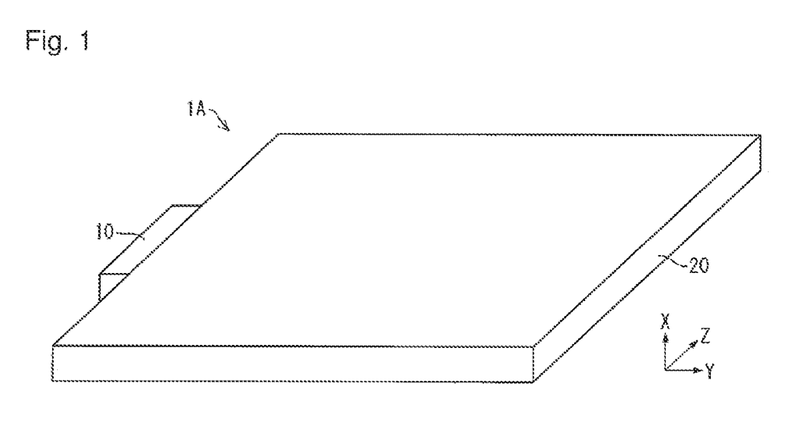
FIG. 1 is a perspective view illustrating a configuration of a display device according to a first embodiment of the present invention.
Figure 2:
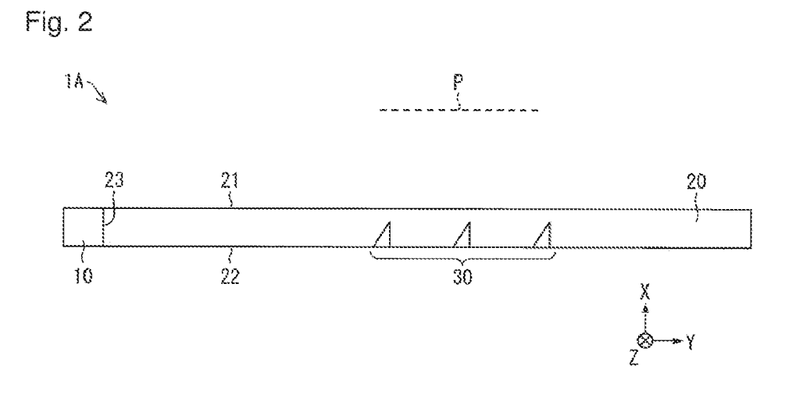
FIG. 2 is a sectional view illustrating the configuration of the display device.
Figure 3:
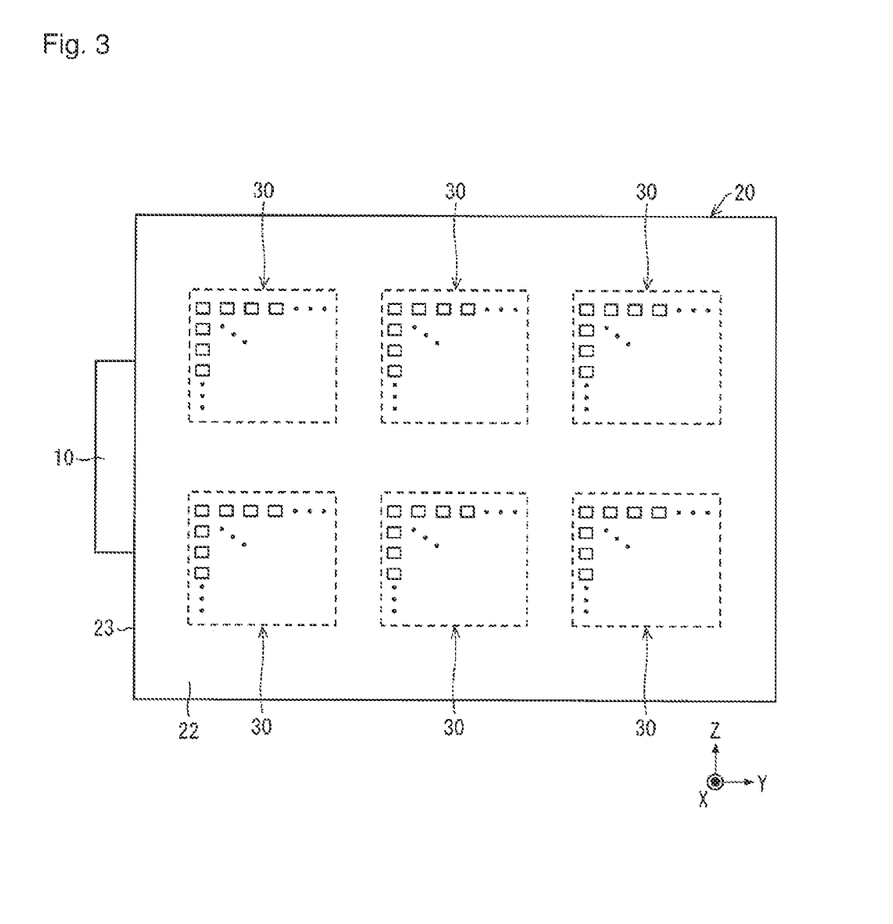
FIG. 3 is a plan view illustrating the configuration of the display device.

FIG. 1 is a perspective view illustrating the configuration of the display device 1A. FIG. 2 is a sectional view illustrating the configuration of the display device 1A. FIG. 3 is a plan view illustrating the configuration of the display device 1A. In the following, for the convenience of description, a +x direction in FIG. 1 may be described as a front direction, a −x direction as a back direction, a +y direction as a right direction, a −y direction as a left direction, a +z direction as an up direction, and a −z direction as a down direction.

As illustrated in FIGS. 1 to 3, the display device 1A includes a light source 10 and a light guide plate (optical element) 20.

The light source 10 is a member for irradiating the light guide plate 20 with light and is formed of, for example, a light emitting diode (LED). The light source 10 may have a configuration including one light emitting diode or a configuration including a plurality of light emitting diodes.

The light guide plate 20 is a member that guides light (incident light) incident from the light source 10, and the shape of light guide plate 20 is not limited but is substantially rectangular parallelepiped shape in the present embodiment. The light guide plate 20 is formed of a transparent resin material having a relatively high refractive index. As a material for forming the light guide plate 20, for example, polycarbonate resin, polymethyl methacrylate resin, or the like can be used. In the present embodiment, the light guide plate 20 is formed of polymethyl methacrylate resin. In the present embodiment, since the light guide plate 20 is transparent, the observer can visually recognize the rear surface side of the display device 1A through the light guide plate 20. Thereby, in the display device 1A, the observer can visually recognize a stereoscopic image or a reference image, described later, without being conscious of the display device 1A.

As illustrated in FIG. 2, the light guide plate 20 includes an outgoing surface 21, a rear surface 22, and an incident surface 23.

The outgoing surface 21 is a surface that emits light guided inside the light guide plate 20 and changed in its optical path by an optical path changing unit 30, described later. The outgoing surface 21 constitutes the front surface of the light guide plate 20. The rear surface 22 is a surface parallel to the outgoing surface 21 and is a surface on which the optical path changing unit 30 is disposed. Note that the rear surface 22 may not be parallel to the outgoing surface 21. The incident surface 23 is a surface where the light emitted from the light source 10 enters the inside of the light guide plate 20.

The light emitted from the light source 10 and enters the light guide plate 20 from the incident surface 23 is totally reflected by the outgoing surface 21 or the rear surface 22 and guided through the light guide plate 20.

The optical path changing unit 30 is disposed on the rear surface 22 inside the light guide plate 20 and is a member for changing the optical path of the light guided in the light guide plate 20 to emit the light from the outgoing surface 21. Further, the optical path changing unit 30 is a member for forming a part of a stereoscopic image, or a part of a reference image, to be visually recognized by an observer. As illustrated in FIG. 3, a plurality of optical path changing units 30 are provided on the rear surface 22 of the light guide plate 20.

Figures 4A, 4B:
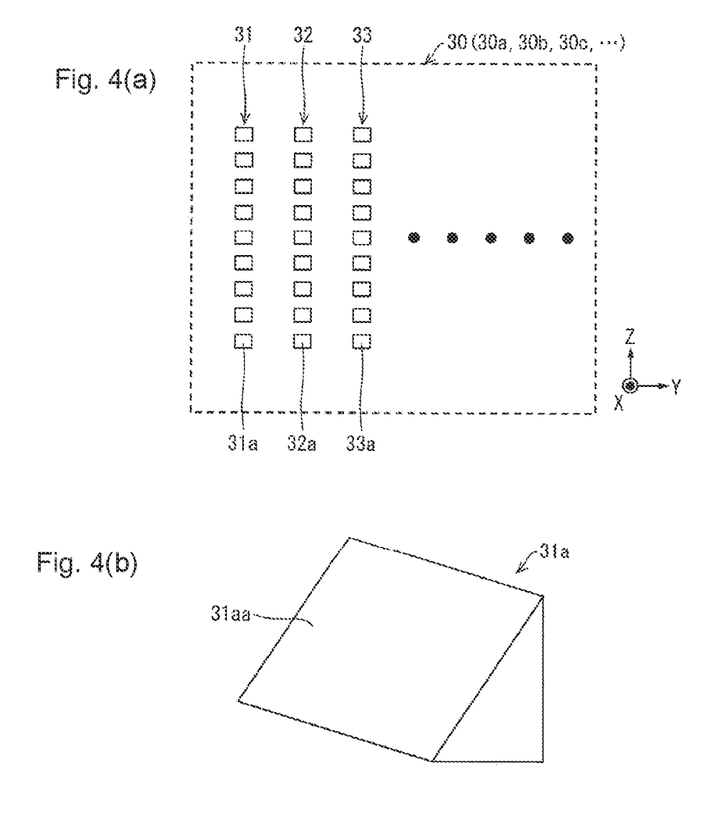
FIG. 4(a) is a plan view illustrating a configuration of an optical path changing unit provided in the display device.
FIG. 4(b) is a perspective view illustrating a configuration of a reflector provided for changing the optical path.

FIG. 4(a) is a plan view illustrating the configuration of the optical path changing unit 30, and FIG. 4(b) is a perspective view illustrating the configuration of the reflector 31a.

As illustrated in FIG. 4(a), the optical path changing unit 30 is made up of optical path changing unit groups 31, 32, 33 . . . . In FIG. 4(a), for the sake of simplicity, only the optical path changing unit groups 31 to 33 are illustrated. Each of the optical path changing unit groups 31, 32, 33 . . . is formed by a plurality of reflectors (prisms) provided along a direction parallel to the incident surface 23. For example, the optical path changing unit group 31 is made up of a plurality of reflectors 31a. Similarly, the optical path changing unit groups 32, 33 . . . are made up of a plurality of reflectors 32a, 33a, . . . , respectively.

As illustrated in FIG. 4(b), the reflector 31a has a triangular pyramidal shape and has a reflective surface 31aa that reflects (totally reflects) the incident light. For example, the reflector 31a may be a recess formed on the rear surface 22 of the light guide plate 20. The reflectors 32a, 33a . . . also have the same structure as the reflector 31a. The reflector 31a is not limited to the triangular pyramid shape.

Figure 5:
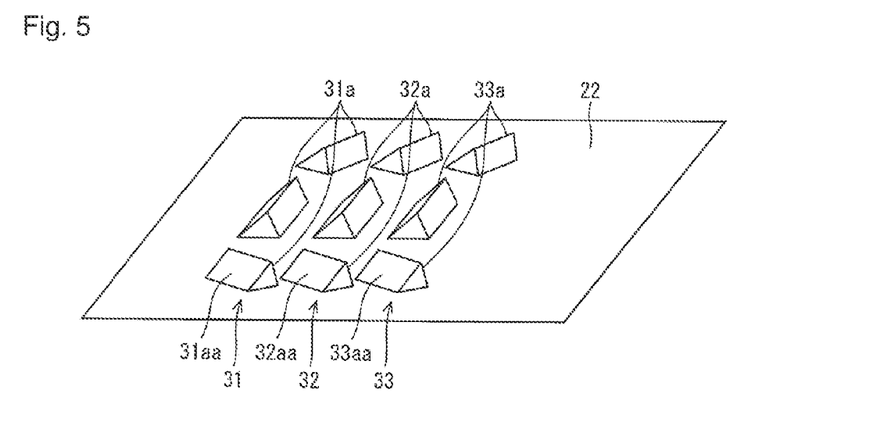
FIG. 5 is a perspective view illustrating arrangement of reflectors in the optical path changing unit.

FIG. 5 is a perspective view illustrating the arrangement of the reflectors 31a, 32a, 33a in the optical path changing unit 30.

As illustrated in FIG. 5, in the respective optical path changing unit groups 31, 32, 33 . . . , reflective surfaces 31aa, 32aa, 33aa . . . of the plurality of reflectors 31a, 32a, 33a . . . are arranged on the rear surface 22 of the light guide plate 20 so as to have mutually different angles with respect to the incident direction of the light. Thus, each of the optical path changing unit groups 31, 32, 33 . . . changes the optical path of the incident light and emits the light in various directions from the outgoing surface 21

Next, a method for forming a part of a stereoscopic image or a part of a reference image by the optical path changing unit 30 will be described with reference to FIG. 6. Here, one plane image I, which is a part of a stereoscopic image, is formed on a stereoscopic image forming plane P which is a plane vertical to the outgoing surface 21 of the light guide plate 20 by the light path changed by the optical path changing unit 30 will be described.

Figure 6:
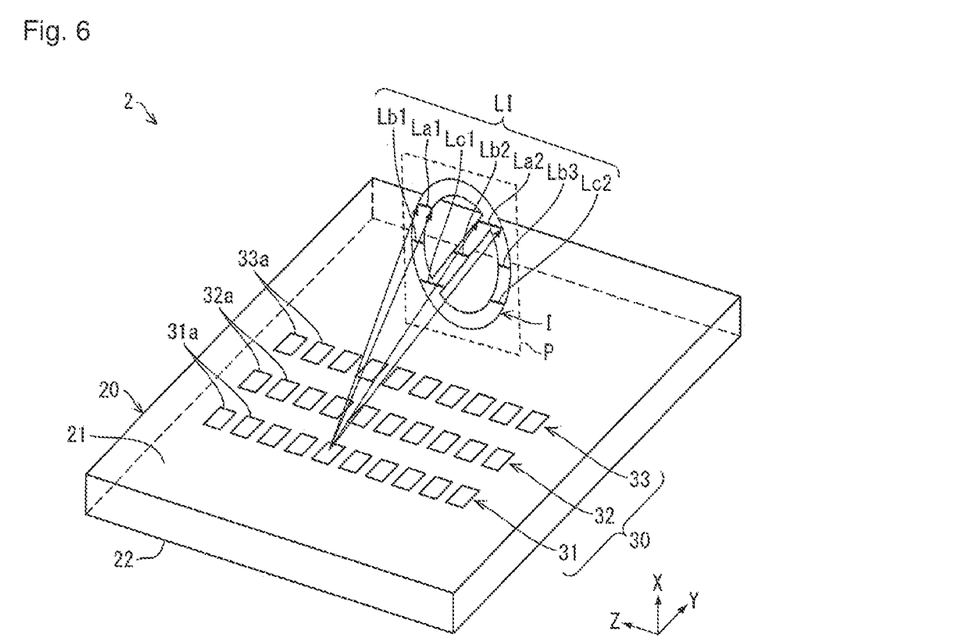
FIG. 6 is a perspective view illustrating a method for forming a plane image by the optical path changing unit.

FIG. 6 is a perspective view illustrating a method for forming the plane image I by the optical path changing unit 30. Here, the formation of a ring mark with diagonal lines as a plane image I on a stereoscopic image forming plane P will be described.

In the display device 1A, as illustrated in FIG. 6, for example, the light changed in its optical path by each reflector 31a of the optical path changing unit group 31 intersects the stereoscopic image forming plane P on a line La1 and a line La2. Thereby, a line image LI which is a part of the plane image I is formed on the stereoscopic image forming plane P. The line image LI is a line image parallel to the YZ plane. In this manner, the line image LI of the line La1 and the line La2 is formed by the light from each of a large number of reflectors 31a belonging to the optical path changing unit group 31. Note that the light for forming the images of the lines La1, La2 may be provided by at least two reflectors 31a in the optical path changing unit group 31.

Likewise, the light changed in its optical path by each reflector 32a of the optical path changing unit group 32 intersects the stereoscopic image forming plane P at the lines Lb1, Lb2 or Lb3. Thereby, a line image LI which is a part of the plane image I is formed on the stereoscopic image forming plane P.

Further, the light changed in its optical path by each reflector 33a of the optical path changing unit group 33 intersects the stereoscopic image forming plane P at the line Lc1 or Lc2. Thereby, a line image LI which is a part of the plane image I is formed on the stereoscopic image forming plane P.

The positions in the X-axis direction of the line images formed by the optical path changing unit groups 31, 32, 33 . . . are different from each other. In the display device 1A, by reducing the distances among the optical path changing unit groups 31, 32, 33 . . . , it is possible to reduce the distance in the X-axis direction of the line image LI to be formed by each of the optical path changing unit groups 31, 32, 33 . . . . As a result, in the display device 1A, by accumulating a plurality of line images LI each formed by the light changed in its optical path by each of the reflectors 31a, 32a, 33a . . . of the optical path changing unit groups 31, 32, 33 . . . , the plane image I is substantially formed on the stereoscopic image forming plane P.

Note that the stereoscopic image forming plane P may be a plane vertical to the X-axis, a plane vertical to the Y-axis, or a plane vertical to the Z-axis. Further, the stereoscopic image forming plane P may be a plane that is not vertical to the X-axis, the Y-axis, or the Z-axis. Moreover, the stereoscopic image forming plane P may be a curved surface instead of a plane. That is, the display device 1A can cause the optical path changing unit 30 to form the plane image I on an arbitrary plane (plane and curved surface) on the space. In the display device 1A, for example, a plane image is formed on a stereoscopic image forming plane, which is vertical to the outgoing surface 21, by light changed in its optical path by one optical path changing unit 30 among the plurality of optical path changing units 30. A plane image is formed on a stereoscopic image forming plane, which is parallel to the outgoing surface 21, by light changed in its optical path by another optical path changing unit 30 among the plurality of optical path changing units 30.

In FIG. 3, each optical path changing unit 30 is described in a single region, but this is for the convenience of description, and the display device of the present invention is not limited thereto. That is, in the display device of one aspect of the present invention, for example, two optical path changing units 30 for displaying two stereoscopic images may be provided in the same region.

Display Examples of Display Device 1A

Next, Display Examples 1 to 6 of stereoscopic images, using the display device 1A, will be described. FIGS. 7(a) to 7(d) and 8(a) to 8(d) are perspective views illustrating a display example of a stereoscopic image by using the display device 1A. In the following description, in order to distinguish the plurality of optical path changing units 30 from each other, they are referred to as optical path changing units 30a, 30b, 30c.

Display Example 1

Figure 7A:
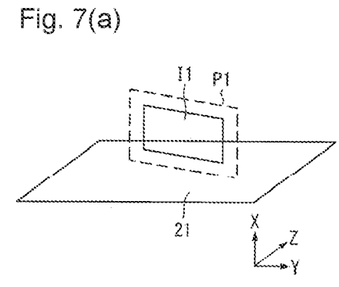
FIGS. 7(a) to 7(d) are perspective views illustrating display examples using the display device.

Display Example 1 will be described with reference to FIG. 7(a). As illustrated in FIG. 7(a), in the present display example, the display device 1A forms a stereoscopic image I1 which is a plane image on a stereoscopic image forming plane P1 which is a plane vertical to the outgoing surface 21 of the light guide plate 20. Specifically, the display device 1A forms the stereoscopic image I1 on the stereoscopic image forming plane P1 by the light changed in its optical path by the optical path changing unit 30a.

As described above, in Display Example 1, the display device 1A forms the image of the stereoscopic image I1 on the stereoscopic image forming plane P1 which is a plane vertical to the outgoing surface 21. As a result, even when the transparent light guide plate 20 is used, the display device 1A enables the observer to visually recognize the stereoscopic image I1 having a stereoscopic effect.

In the present display example, an example has been described where the stereoscopic image I1 is formed (displayed) on the stereoscopic image forming plane P1 which is a plane vertical to the outgoing surface 21. However, the display device 1A of the present invention is not limited thereto. That is, the display device 1A according to one embodiment of the present invention may form (display) the stereoscopic image I1 on a plane not parallel to the outgoing surface 21. In this case, the stereoscopic image I1 is formed on a plane intersecting a plane parallel to the outgoing surface 21. Thereby, even when the transparent light guide plate 20 is used, the display device 1A enables the observer to visually recognize the stereoscopic image I1 having a stereoscopic effect. Note that the stereoscopic image I1 may be a part of a stereoscopic image formed by the display device 1A. That is, a stereoscopic image which is at least a part of the stereoscopic image may be formed (displayed) on the stereoscopic image forming plane P1.

Display Example 2

Figure 7B:
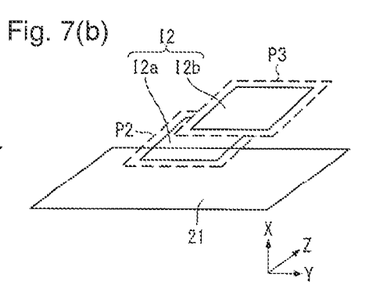

Display Example 2 will be described with reference to FIG. 7(b). As illustrated in FIG. 7(b), in the present display example, the display device 1A forms a stereoscopic image I2. The stereoscopic image I2 includes a plane image I2a formed on a stereoscopic image forming plane P2 which is a plane parallel to the outgoing surface 21 of the light guide plate 20, and a plane image I2b formed on a stereoscopic image forming plane P3 which is a plane parallel to the outgoing surface 21 and different from the stereoscopic image forming plane P2. Specifically, the display device 1A forms the plane image I2a on the stereoscopic image forming plane P2 by the light changed in its optical path by the optical path changing unit 30b, and the plane image I2b on the stereoscopic image forming plane P3 which is a plane parallel to the outgoing surface 21 by the light changed in its optical path by the optical path changing unit 30c As described above, in Display Example 2, the display device 1A forms the plane images I2a, I2b on the stereoscopic image forming planes P2, P3, which are planes parallel to the outgoing surface 21, respectively (i.e., the display device 1A forms the stereoscopic image I2). That is, the stereoscopic image I2 has two planes (plane images I2a, I2b) positioned on mutually different planes. As a result, even when the transparent light guide plate 20 is used, the display device 1A can make the observer feel that the plane images I2a, I2b are formed on mutually different planes. That is, the display device 1A enables the observer to visually recognize the stereoscopic image I2 having a stereoscopic effect.

In the present display example, the stereoscopic image I2 is made up of the two plane images I2a, I2b, but the display device 1A of the present invention is not limited thereto. That is, the stereoscopic image I2 formed by the display device 1A may include plane images that are different from each other and formed on three or more stereoscopic image forming planes parallel to one another.

Figure 7C:
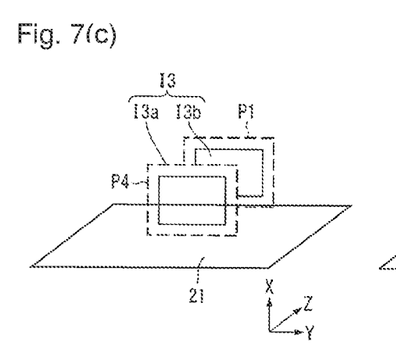

Further, in the present display example, an example has been described where the plane images I2a, I2b are formed (displayed) on the stereoscopic image forming planes P2, P3 which are planes parallel to the outgoing surface 21. However, the display device 1A of the present invention is not limited thereto. That is, as illustrated in FIG. 7(c), the display device 1A according to the embodiment of the present invention may form (display) plane images I3a, I3b as a stereoscopic image I3 on stereoscopic image forming planes P1, P4 which are planes vertical to the outgoing surface 21.

Further, the display device 1A is not limited to the aspect in which the stereoscopic image with two plane images is formed on the stereoscopic image forming planes that are parallel to each other. That is, the display device 1A according to one aspect of the present invention may display stereoscopic images having two mutually different planes positioned on planes that are not parallel to each other. The stereoscopic image formed by the display device 1A may include another surface or line besides the two planes.

Display Example 3

Figure 7D:
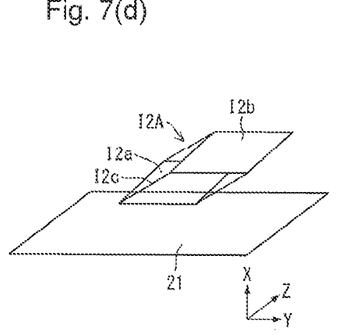

Display Example 3 will be described with reference to FIG. 7(d). As illustrated in FIG. 7(d), in the present display example, the display device 1A forms a stereoscopic image I2A. The stereoscopic image I2A has a line image I2c in addition to the plane images I2a, I2b in the stereoscopic image I2 of Display Example 2. The line image I2c is a line segment connecting the plane image 12a and the plane image I2b formed on two mutually different planes. The line image I2c is formed by the light changed in its optical path by an optical path changing unit 30d.

As described above, in Display Example 3, the display device 1A forms the stereoscopic image I2A having a line image I2c that connects the plane image I2a and the plane image I2b. Hence it is possible to make the observer feel the thickness of the stereoscopic image I2A with the line image I2c, thus enabling the observer to visually recognize the stereoscopic image I2A having a stereoscopic effect.

Display Example 4

Figure 8A:
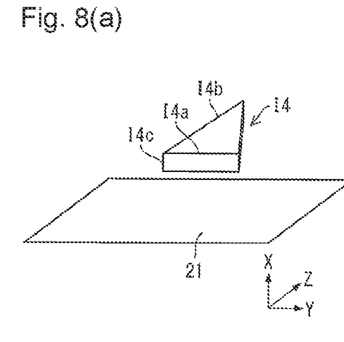
FIGS. 8(a) to 8(d) are perspective views illustrating other display examples using the display device.

Display Example 4 will be described with reference to FIG. 8(a). As illustrated in FIG. 8(a), in the present display example, the display device 1A forms a triangular prismatic stereoscopic image I4.

The stereoscopic image I4 includes two line segments (e.g., line segments I4a, I4b illustrated in FIG. 8(a)) that are parallel to one plane and are not parallel to each other, and one line segment that is not parallel to the plane (i.e., line segment I4c illustrated in FIG. 8(a)). As a result, the stereoscopic image I4 is a stereoscopic image with a high stereoscopic effect. Thereby, even when the transparent light guide plate 20 is used, the display device 1A enables the observer to visually recognize the stereoscopic image I4 having a stereoscopic effect.

In Display Example 4, the display device 1A forms a triangular prismatic stereoscopic image I4, but the display device 1A of the present invention is not limited thereto. That is, the stereoscopic image I4 formed by the display device 1A may be any stereoscopic image so long as including two line segments that are parallel to one plane and are not parallel to each other and one line segment that is not parallel to the plane. A stereoscopic image including such three components cannot be fit on one plane but always becomes a stereoscopic image having a three-dimensional shape.

Display Example 5

Figure 8B:
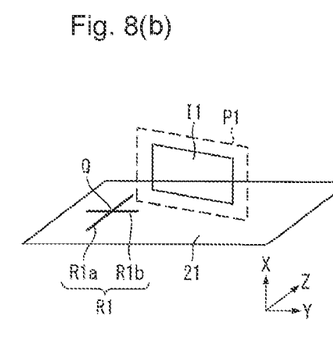

Display Example 5 will be described with reference to FIG. 8(b). As illustrated in FIG. 8(b), in the present display example, the display device 1A forms a reference image R1 separately from the stereoscopic image I1 in Display Example 1.

The reference image R1 includes two line segments R1a, R1b that are parallel to the outgoing surface 21 and orthogonal to each other. Line segments R1a, R1b intersect at a point Q. The reference image R1 is formed by the light changed in its optical path by the optical path changing unit 30e.

As described above, in Display Example 5, the display device 1A forms the reference image R1 separately from the stereoscopic image I1. Thus, since the observer can recognize the stereoscopic image I1 with reference to the reference image R1 as a reference, the observer can visually recognize the stereoscopic image I1 as an image having a more stereoscopic effect as compared with Display Example 1.

In the display example, the reference image R1 has two line segments R1a, R1b parallel to the outgoing surface 21, but the display device 1A of the present invention is not limited thereto. That is, the reference image R1 formed by the display device 1A may be an image that includes two line segments orthogonal to each other, and is not necessarily required to be parallel to the outgoing surface 21.

Figure 8C:
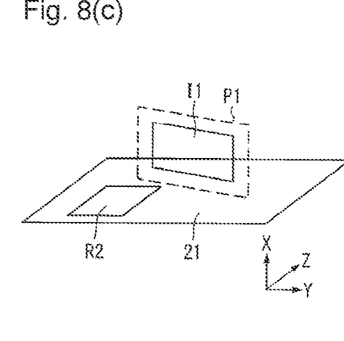

Further, in the present display example, the example of forming the reference image R1 including the two line segments R1a, R1b has been described, but the display device 1A of the present invention is not limited thereto. That is, as illustrated in FIG. 8(c), the display device 1A of one embodiment of the present invention may form a reference image R2 made up of a plane image parallel to the outgoing surface 21. Thus, the observer can recognize the stereoscopic image I1 with reference to the reference image R2, so that the observer can visually recognize the stereoscopic image I1 as an image having a more stereoscopic effect as compared with Display Example 1. The reference image R2 is made of the plane image and can thus be said to include two line segments orthogonal to each other.

The plane on which the reference images R1, R2 are formed may be parallel to the plane on which the stereoscopic image I1 is formed but is preferably not parallel thereto in order to improve the stereoscopic effect of the stereoscopic image I1. The plane on which the reference images R1, R2 are formed is more preferably vertical to the plane on which the stereoscopic image I1 is imaged. Further, the plane on which the reference images R1, R2 are formed is preferably parallel to the outgoing surface 21.

Note that the display method in the present display example is also effective particularly in a display device that displays stereoscopic images by fusion due to parallax, using light emitted from a light guide plate as a transparent optical element. That is, in a parallax type stereoscopic image display device, by enabling the observer to recognize (by displaying) a reference image including two line segments orthogonal to each other separately from an image recognized by the observer as a stereoscopic image, thus enabling the observer to visually recognize a stereoscopic image having a stereoscopic effect.

Display Example 6

Figure 8D:
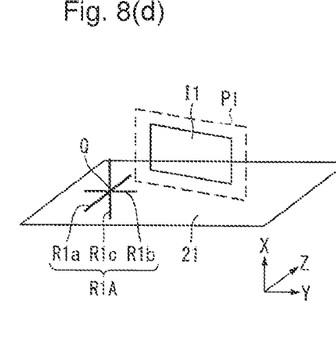

Display Example 6 will be described with reference to FIG. 8(d). As illustrated in FIG. 8(d), in the present display example, a display device 1A forms the reference image R1A separately from the stereoscopic image I1 in Display Example 1. The reference image R1A includes a line segment R1c in addition to the line segments R1a, R1b in the reference image R1 of Display Example 5. The line segment R1c is a line segment orthogonal to the line segments R1a, R1b.

As described above, in Display Example 6, the display device 1A forms a reference image R1A made up of the three line segments R1a, R1b, R1c orthogonal to each other separately from the stereoscopic image I1. Thereby, the observer can visually recognize the stereoscopic image I1 as an image having a more stereoscopic effect as compared with Display Example 5. Each of the line segments R1a, R1b, R1c may be imaged on a plane different from the plane on which the stereoscopic image I1 is formed. The line segment R1c may be parallel to the plane on which the stereoscopic image I1 is imaged.

Here, in the case of displaying the stereoscopic image I1 by using the light guide plate 20 as in the display device 1A of the present embodiment, due to a shape error (sag or the like) of the reflectors 31a, 32a, 33a, the displayed stereoscopic image I1 may be blurred or its contrast may deteriorate, so that the stereoscopic effect of the stereoscopic image I1 may be impaired. In contrast, in Display Example 6, by forming the reference image R1A composed of three line segments R1a, R1b, R1c orthogonal to each other, separately from the stereoscopic image I1, it is possible to increase trails to obtain a stereoscopic effect of the stereoscopic image I1. As a result, it is possible for the observer to visually recognize a stereoscopic image having a stereoscopic effect.

The reference images R1, R1A, R2 in Display Examples 5 and 6 have been images each formed by light changed in its optical path by the optical path changing unit 30 of the display device 1A. However, the display device 1A of the present invention is not limited thereto. That is, in the display device 1A of one embodiment of the present invention, a line or a plane image as a reference image may actually be drawn on the outgoing surface 21 or the rear surface 22 of the light guide plate 20 by using a marker or the like, for example. As a result, the drawn reference image may be displayed separately from the stereoscopic image. Further, a transparent sheet (thin film) in which a line or a plane image as a reference image is actually drawn by using a marker or the like is provided on (pasted to) the outgoing surface 21 or the rear surface 22 of the light guide plate 20, the drawn reference image may be displayed separately from the stereoscopic image.

In a conventional technique (e.g., three-dimensional (3D) television, etc.), a display device for displaying a stereoscopic image is provided with a frame (image frame) around an optical element that emits light that is recognized as a stereoscopic image to an observer. This enables the observer to recognize the stereoscopic image as an image having a stereoscopic effect with the frame as the reference plane. However, when the display device is used as a guide plate or the like, it is preferable to omit the frame and make the observer unconscious of the display device. Therefore, in the display device 1A according to the present embodiment, by displaying a stereoscopic image as in Display Examples 1 to 6 above, even in the absence of the frame (image frame) (i.e., when the light guide plate 20 is transparent), it is possible for the observer to visually recognize a stereoscopic image having a stereoscopic effect.

Second Embodiment

Hereinafter, another embodiment of the present invention will be described with reference to FIGS. 9 to 12. For convenience of description, members having the same functions as the members described in the above embodiment are denoted by the same reference numerals, and the description thereof is omitted.

A configuration of a display device 1B in the present embodiment will be described with reference to FIG. 9

Figure 9:
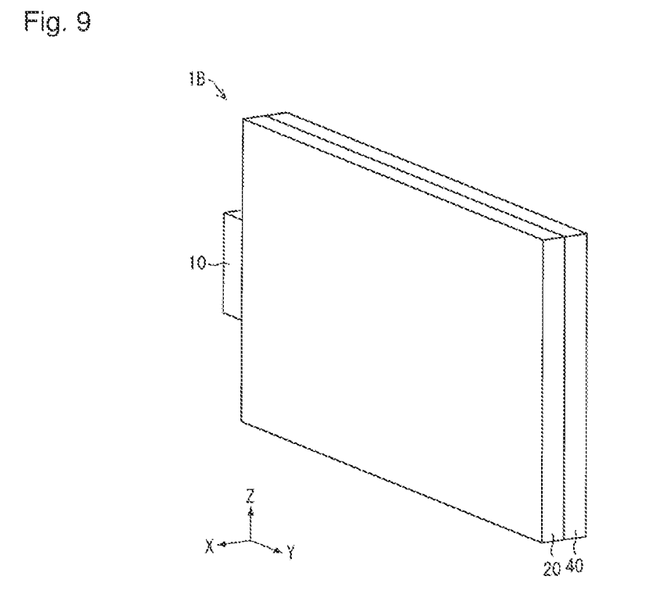
FIG. 9 is a perspective view illustrating a configuration of a display device according to a second embodiment of the present invention.

FIG. 9 is a perspective view illustrating the configuration of the display device 1B. As illustrated in FIG. 9, the display device 1B includes a two-dimensional image display device 40 in addition to the configuration of the display device 1A in the first embodiment, and a light guide plate 60 of the two-dimensional image display device 40, described later, is superimposed on to the light guide plate 20.

Next, the two-dimensional image display device 40 will be described with reference to FIGS. 10 to 12.

Figure 10:
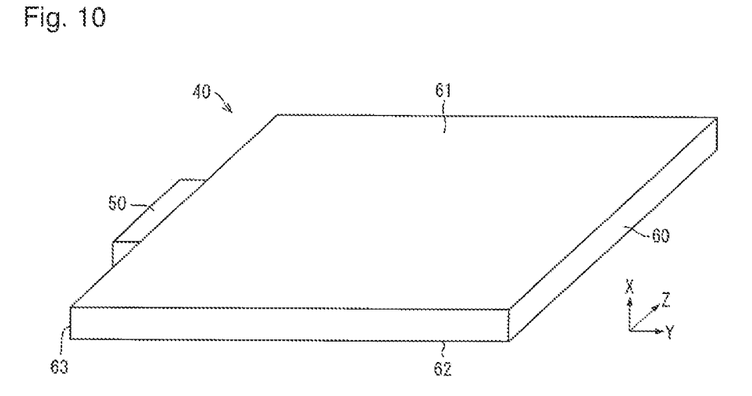
FIG. 10 is a perspective view illustrating a configuration of a two-dimensional image display device provided in the display device.

FIG. 10 is a perspective view illustrating a configuration of the two-dimensional image display device 40. FIG. 11 is a plan view illustrating a configuration of an optical path changing unit 80 provided in the two-dimensional image display device 40.

Figure 11:
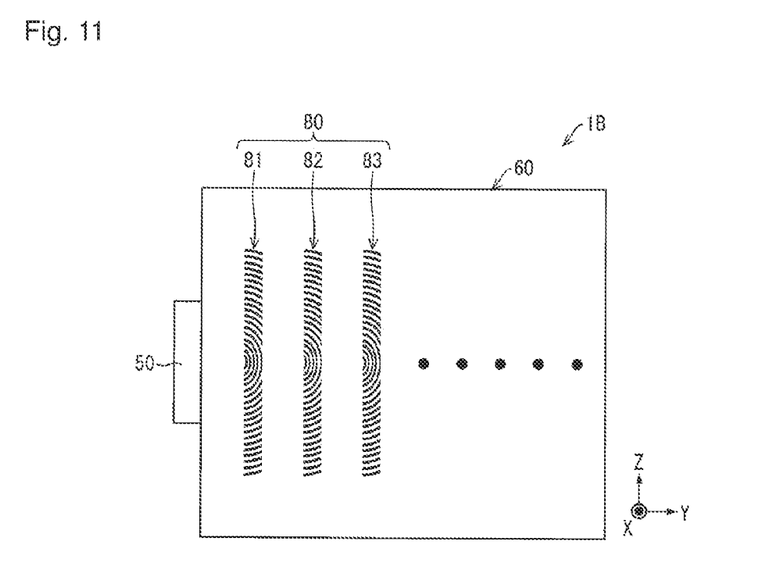
FIG. 11 is a plan view illustrating a configuration of an optical path changing unit provided in the two-dimensional image display device.

As illustrated in FIGS. 10 and 11, the two-dimensional image display device 40 includes a light source 50 and the light guide plate (optical element) 60.

The light source 50 is a member for irradiating the light guide plate 60 with light, and is formed of, for example, a light emitting diode (LED). The light source 50 may have a configuration including one light emitting diode or a configuration including a plurality of light emitting diodes.

The light guide plate 60 is a member that guides light incident from the light source 50, and the shape of light guide plate 60 is not limited but is substantially rectangular parallelepiped shape in the present embodiment. The light guide plate 60 has substantially the same size as the light guide plate 20 in the display device 1A. The light guide plate 60 is formed of a transparent resin material having a relatively high refractive index. As a material for forming the light guide plate 60, for example, polycarbonate resin, polymethyl methacrylate resin, or the like can be used. In the present embodiment, the light guide plate 60 is formed of polymethyl methacrylate resin. In the display device 1B, since the light guide plate 20 and the light guide plate 60 are transparent, the observer can visually recognize the rear surface side of the display device 1B through the light guide plate 20 and the light guide plate 60. Thereby, in the display device 1B, the observer can visually recognize a stereoscopic image or a reference image without being conscious of the display device 1B.

As illustrated in FIG. 10, the light guide plate 60 includes an outgoing surface 61, a rear surface 62, and an incident surface 63.

The outgoing surface 61 is a surface that emits light guided inside the light guide plate 60, the light changed in its optical path by an optical path changing unit 80 described later. The outgoing surface 61 constitutes the front-side surface (front surface) of the light guide plate 60. The rear surface 62 is a surface parallel to the outgoing surface 61 and is a surface on which the optical path changing unit 80 is disposed. The detail of the optical path changing unit 80 will be described later. The incident surface 63 is a surface where the light emitted from the light source 50 enters the inside of the light guide plate 60.

The optical path changing unit 80 is disposed on the rear surface 62 inside the light guide plate 60 and is a member for changing the optical path of the light guided in the light guide plate 60 to emit the light from the outgoing surface 61. As illustrated in FIG. 11, the optical path changing unit 80 is made up of optical path changing unit groups 81, 82, 83 . . . . Note that FIG. 11 only illustrates the optical path changing unit groups 81 to 83 for the sake of simplicity.

Each of the optical path changing unit groups 81, 82, 83 . . . is provided along the direction parallel to the incident surface 63, and is each formed of a part of the Fresnel lens.

In the display device 1B, for example, a point image is formed on the stereoscopic image forming plane by the light changed in its optical path by the optical path changing unit group 81. Similarly, a point image is formed on the stereoscopic image forming plane by the light changed in its optical path by each of the optical path changing unit groups 82, 83 . . . . In the display device 1B, by reducing the distances among the optical path changing unit groups 81, 82, 83 . . . , it is possible to reduce the distance of the point image to be formed by each of the optical path changing unit groups 81, 82, 83 . . . . As a result, in the display device 1B, by accumulating a plurality of point images each formed by the light changed in its optical path by each of the optical path changing unit groups 81, 82, 83 . . . , a stereoscopic image, which is a line image, is substantially formed on the stereoscopic image forming plane.

Figure 12:
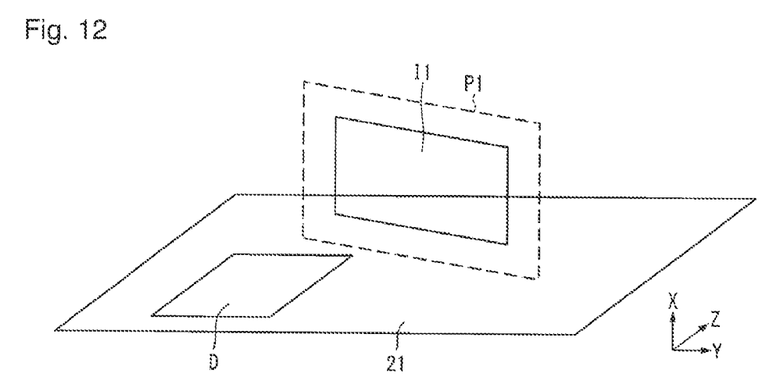
FIG. 12 is a perspective view illustrating a display example using the display device.

FIG. 12 is a perspective view illustrating a display example by the display device 1B.

In the display device 1B, the light guide plate 60 is provided as superimposed on the light guide plate 20. Therefore, as illustrated in FIG. 12, the stereoscopic image I1 is formed by the light emitted from the light guide plate 20, and the two-dimensional image D, which is made of a plane image and parallel to the outgoing surface 21, is formed by the light emitted from the light guide plate 60. As a result, the observer can recognize the two-dimensional image D as the stereoscopic image I1 as the reference image R2 in Display Example 5 described above, so that the observer can visually recognize the stereoscopic image I1 as an image having a more stereoscopic effect as compared with Display Example 1.

Third Embodiment

Hereinafter, another embodiment of the present invention will be described with reference to FIG. 13. For convenience of description, members having the same functions as the members described in the above embodiment are denoted by the same reference numerals, and the description thereof is omitted.

In the display devices 1A, 1B according to the first and second embodiments, the light guided inside the light guide plate 20 or the light guide plate 60 is changed in its optical path by the optical path changing unit, emitted from the outgoing surface 21 or 61 to form a stereoscopic image or a reference image. However, the display method of the present invention is not limited thereto. That is, light may be emitted from the optical element by using light emitted from an object to be an original image of a stereoscopic image or a reference image to form a stereoscopic image or a reference image.

A display device that emits light from an optical element by using light emitted from an object to be an original image and forms a stereoscopic image or a reference image is, for example, as follows: (1) a display device using a two-sided reflector array structure in which a plurality of mutually orthogonal mirror surface elements are arranged in the optical coupling element plane as disclosed in Patent Document 2; and (2) a so-called "Pepper's Ghost" display device using a half mirror. In these display devices as well, the optical element such as the two-sided reflector array structure or the half mirror (hereinafter referred to as an optical element 100) is transparent and the observer can visually recognizes the rear surface side of the display device through the optical element 100.

Figure 13A:
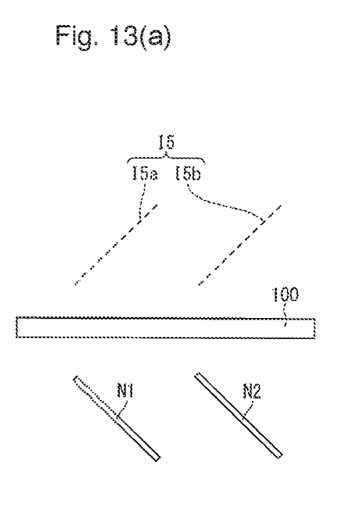
FIGS. 13(a) and 13(b) are diagrams illustrating display examples using an optical element according to a third embodiment of the present invention.
Figure 13B:
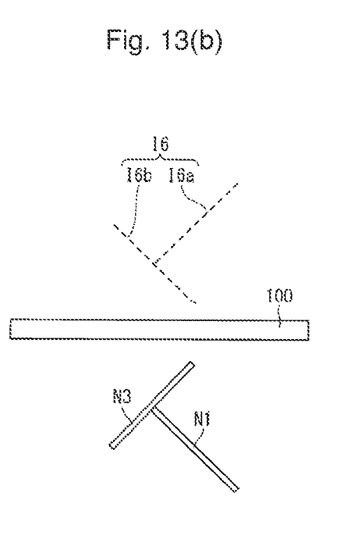

FIGS. 13(a) and 13(b) are diagrams illustrating display examples of a display method using the optical element 100. Display Examples 7 and 8 in the case of using the optical element 100 will be described with reference to FIG. 13.

Display Example 7

Display Example 7 will be described with reference to FIG. 13(a). As illustrated in FIG. 13(a), in the present display example, a display N1 and a display N2 that each emit light to be an original image of a stereoscopic image I5 are arranged on one side with respect to the optical element 100. The display N1 and the display N2 are disposed in parallel to each other. The light emitted from each of the display N1 and the display N2 enters the optical element 100, changed in its optical path by the optical element 100, and emitted from the optical element 100. Then, by the light emitted from the optical element 100, each of a plane image I5a and a plane image I5b as the stereoscopic image I5 is formed on the side opposite to the one side with respect to the optical element 100.

As described above, in Display Example 7, the plane images I5a, 5b are formed (i.e., the stereoscopic image I5 is formed). That is, the stereoscopic image I5 has two planes (plane images I5a, I5b) positioned on mutually different planes. As a result, in the present display example, even when the transparent optical element 100 is used, it is possible to make the observer feel that the plane images I5a, I5b are formed on different planes. That is, in the present display example, it is possible for the observer to visually recognize the stereoscopic image I5 having a stereoscopic effect.

Display Example 8

Display Example 8 will be described with reference to FIG. 13(b). As illustrated in FIG. 13(b), in the present display example, a display N1 and a display N3 that each emit light to be an original image of a stereoscopic image I6 are arranged on one side with respect to the optical element 100. Note that the display N3 includes a transparent light guide plate that emits light to be an original image. The display N1 and the display N3 are arranged vertically to each other. The light emitted from each of the display N1 and the display N3 enters the optical element 100, changed in its optical path by the optical element 100, and emitted from the optical element 100. Then, by the light emitted from the optical element 100, each of a plane image I6a and a plane image I6b as the stereoscopic image I6 is formed on the side opposite to the one side with respect to the optical element 100. The display N3 includes a transparent light guide plate. Therefore, as illustrated in FIG. 13(b), even when the display N3 is positioned closer to the optical element 100 than the display N1, the light emitted from the display N1 can be transmitted through the display N3 to form the plane image I6a.

As described above, in Display Example 8, the plane images I6a, I6b are formed (i.e., the stereoscopic image I6 is formed). That is, the stereoscopic image I6 has two mutually vertical surfaces (plane images I6a, I6b). As a result, in the present display example, even when the transparent optical element 100 is used, it is possible to make the observer feel that the plane images I6a, I6b are formed on different planes. That is, in the present display example, it is possible for the observer to visually recognize the stereoscopic image I6 having a stereoscopic effect.

In Display Example 8, the display N3 includes the transparent light guide plate that emits light, but the present invention is not limited thereto. For example, instead of the display N3, there may be used a member provided with a light emitting body (e.g., a light emitting diode arranged on a matrix or a light emitting wire) on a transparent flat plate (e.g., glass plate).

SUMMARY

A display method according to one aspect of the present invention is a display method for a stereoscopic image, using a display device provided with a transparent optical element, the display method including: emitting light to be recognized by an observer as a stereoscopic image from the optical element; and displaying at least a part of the stereoscopic image on a plane not parallel to an outgoing surface of the optical element. In the display method, the observer is able to visually recognize a rear surface side of the display device through the optical element.

According to the above feature, since at least a part of the stereoscopic image is formed on a plane that intersects with a plane parallel to the outgoing surface, even when the optical element is transparent, it is possible for the observer to visually recognize a stereoscopic image having a stereoscopic effect.

In the display method according to one aspect of the present invention, at least a part of the stereoscopic image may be displayed on a plane vertical to the outgoing surface of the optical element.

A display method according to one aspect of the present invention is a display method for a stereoscopic image, using a display device provided with a transparent optical element, the display method including emitting light to be recognized by an observer as a stereoscopic image from the optical element. In the display method, the observer is able to visually recognize a rear surface side of the display device through the optical element, and the stereoscopic image has two planes positioned on mutually different planes.

According to the above feature, even when a transparent optical element is used, it is possible to make the observer feel that the stereoscopic image is formed on two different surfaces. That is, it is possible for the observer to visually recognize a stereoscopic image having a stereoscopic effect.

In the display method according to one aspect of the present invention, the two planes may be parallel to each other.

In the display method according to one aspect of the present invention, it is preferable that the stereoscopic image have a line connecting the two planes.

This can make the observer feel the thickness of the stereoscopic image with the line connecting the two planes to the observer. It is thus possible for the observer to visually recognize a stereoscopic image having a stereoscopic effect.

In the display method according to one aspect of the present invention, the two planes may be vertical to each other.

A display method according to one aspect of the present invention is a display method for a stereoscopic image, using a display device provided with a transparent optical element, the display method including emitting light to be recognized by an observer as a stereoscopic image from the optical element. In the display method, the observer is able to visually recognize a rear surface side of the display device through the optical element, and the stereoscopic image includes two line segments that are parallel to one plane and are not parallel to each other and one line segment that is not parallel to the plane.

According to the above feature, it is possible to display a stereoscopic image having a high stereoscopic effect. Thus, even when a transparent optical element is used, it is possible for the observer to visually recognize a stereoscopic image having a stereoscopic effect.

In the display method according to one aspect of the present invention, the plane may be parallel to an outgoing surface of the optical element.

In the display method according to one aspect of the present invention, it is preferable that a reference image including two line segments orthogonal to each other be displayed separately from the stereoscopic image.

Thus, since the observer can recognize the stereoscopic image with reference to the reference image as a reference, the observer can visually recognize the stereoscopic image as an image having a more stereoscopic effect.

In the display method according to one aspect of the present invention, the two line segments included in the reference image may be parallel to an outgoing surface of the optical element.

In the display method according to one aspect of the present invention, the two line segments included in the reference image may intersect at one point.

In the display method according to one aspect of the present invention, the reference image may include one line segment orthogonal to the two line segments included in the reference image.

This makes it possible for the observer to visually recognize the stereoscopic image as an image having a more stereoscopic effect.

In the display method according to one aspect of the present invention, the reference image may be formed of light emitted from the optical element.

In the display method according to one aspect of the present invention, another optical element may be provided so as to be superimposed on the optical element, and the reference image may be formed of light emitted from another optical element.

In the display method according to one aspect of the present invention, a transparent sheet on which an image as the reference image is drawn may be provided on the optical element.

In the display method according to one aspect of the present invention, the optical element may form the stereoscopic image by guiding light incident from the light source, changing an optical path of the guided light, and emitting the light from the outgoing surface to form the stereoscopic image.

A display device according to one aspect of the present invention displays a stereoscopic image by any one of the above display methods.

The present invention is not limited to each of the embodiments described above, but can be subjected to a variety of changes in the scope shown in the claims. An embodiment obtained by appropriately combining technical units disclosed respectively in different embodiments is also included in a technical scope of the present invention.

DESCRIPTION OF SYMBOLS 1A, 1B display device
10, 50 light source
20, 60 light guide plate (optical element)
21, 61 outgoing surface
100 optical element
I1, I2, I2A, I3, I4, I5, I6 stereoscopic image
R1, R1A, R2 reference image

The invention claimed is:

1. A display method for a stereoscopic image, using a display device provided with a transparent optical element, wherein the transparent optical element comprises an incident surface for a light from a light source to enter into the transparent optical element; a rear surface totally reflecting the light entered from the incident surface; an optical path changing unit disposed on the rear surface, the optical path changing unit changing an optical path of the light guided in the transparent optical element; and an outgoing surface emitting the light guided inside the transparent optical element and changed in the optical path by the optical path changing unit, the display method comprising:

emitting the light to be recognized by an observer as a stereoscopic image from the transparent optical element; and displaying at least a part of the stereoscopic image on a plane not parallel to the outgoing surface of the transparent optical element, wherein the observer is able to visually recognize a rear surface side of the display device through the transparent optical element, wherein the stereoscopic image has two planes positioned on mutually different planes, wherein the two planes are parallel to each other, identical in shape, and identical in size, wherein when viewed in a direction perpendicular to the two planes, the two planes do not completely overlap each other, and wherein the optical path changing unit includes: a first optical path changing unit for image formation of a first plane which is one of the two planes; and a second optical path changing unit for image formation of a second plane which is the other of the two planes.

2. The display method according to claim 1, wherein the at least a part of the stereoscopic image is displayed on a plane vertical to the outgoing surface of the transparent optical element.

3. A display method for a stereoscopic image, using a display device provided with a transparent optical element, wherein the transparent optical element comprises an incident surface for a light from a light source to enter into the transparent optical element; a rear surface totally reflecting the light entered from the incident surface; an optical path changing unit disposed on the rear surface, the optical path changing unit changing an optical path of the light guided in the transparent optical element; and an outgoing surface emitting the light guided inside the transparent optical element and changed in the optical path by the optical path changing unit, the display method comprising:

emitting the light to be recognized by an observer as the stereoscopic image from the transparent optical element, wherein the observer is able to visually recognize a rear surface side of the display device through the transparent optical element, wherein the stereoscopic image has two planes positioned on mutually different planes, wherein the two planes are parallel to each other, identical in shape, and identical in size, wherein when viewed in a direction perpendicular to the two planes, the two planes do not completely overlap each other, and wherein the optical path changing unit includes: a first optical path changing unit for image formation of a first plane which is one of the two planes; and a second optical path changing unit for image formation of a second plane which is the other of the two planes.

4. The display method according to claim 3, wherein the stereoscopic image has a line connecting the two planes.

* * * * *